United States Patent
Zheng (10) Patent No.: US 10,212,244 B2
(45) Date of Patent: Feb. 19, 2019

(54) INFORMATION PUSH METHOD, SERVER, USER TERMINAL AND SYSTEM

(71) Applicant: TENCENT TECHNOLOGY (SHENZHEN) COMPANY LIMITED, Shenzhen, Guangdong (CN)

(72) Inventor: Zhihao Zheng, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 363 days.

(21) Appl. No.: 15/042,946

(22) Filed: Feb. 12, 2016

(65) Prior Publication Data

US 2016/0164991 A1    Jun. 9, 2016

Related U.S. Application Data

(63) Continuation of application No. PCT/CN2014/095777, filed on Dec. 31, 2014.

(30) Foreign Application Priority Data

Jan. 3, 2014 (CN) .......................... 2014 1 0003494

(51) Int. Cl.
```
H04L 29/08    (2006.01)
H04L 12/58    (2006.01)
G06K 19/06    (2006.01)
```
(52) U.S. Cl.
CPC ........ *H04L 67/26* (2013.01); *G06K 19/06037* (2013.01); *H04L 51/08* (2013.01)

(58) Field of Classification Search
CPC .... H04L 67/26; H04L 51/08; G06K 19/06037
See application file for complete search history.

(56) References Cited

U.S. PATENT DOCUMENTS 9,710,741 B2 * 7/2017 Nosaka ............. G06K 19/0614
2004/0249758 A1 * 12/2004 Sukeda ................. G06Q 30/02
705/57

(Continued)

FOREIGN PATENT DOCUMENTS

CN       102567877 A    7/2012
CN       102663601 A    9/2012

(Continued)

OTHER PUBLICATIONS

Chan, H. "How To_ Make Your QR Codes More Beautiful", http://mashable.com/2011/04/18/qr-code-design-tips/, Apr. 18, 2011 (Apr. 18, 2011), the section 3, mailed on Apr. 18, 2011.

(Continued)

*Primary Examiner* — Lashonda T Jacobs
(74) *Attorney, Agent, or Firm* — Baker & Hostetler LLP (57) ABSTRACT

An information push method includes: an information push server determining recommendation information that currently needs to be pushed to a target user; the information push server obtaining setup information of the target user, where the setup information includes personalized graphic information preset by the target user; the information push server generating, according to the setup information of the target user, a personalized two-dimensional code that bears the recommendation information, where an image of the personalized two-dimensional code carries the personalized graphic information preset by the target user; and the information push server pushing the personalized two-dimensional code to the target user. By using the present disclosure, a click-through rate and conversion rate that a two-dimensional code pushed on the Internet has from a user can be improved.

9 Claims, 7 Drawing Sheets

(56) References Cited

U.S. PATENT DOCUMENTS

| | | | |
|---|---|---|---|
| 2009/0242649 A1* | 10/2009 | Mizukoshi | G06K 19/06037 235/494 |
| 2012/0325902 A1 | 12/2012 | Goyal | |
| 2013/0018726 A1* | 1/2013 | Ionescu | G06Q 30/00 705/14.49 |
| 2013/0020393 A1* | 1/2013 | Hwang | G06K 19/06112 235/462.11 |
| 2013/0021364 A1* | 1/2013 | Azuma | G06K 19/06103 345/589 |
| 2013/0219254 A1* | 8/2013 | Kashork | G06Q 30/00 715/205 |
| 2014/0120886 A1* | 5/2014 | Xu | G06O 20/3276 455/414.1 |
| 2014/0326792 A1* | 11/2014 | Sakahashi | G06K 19/06037 235/494 |
| 2014/0326793 A1* | 11/2014 | Windmueller | G06K 19/06037 235/494 |
| 2015/0332136 A1* | 11/2015 | Nosaka | G06K 19/0614 235/494 |
| 2016/0042262 A1* | 2/2016 | Tanaka | G06K 7/1417 235/494 |
| 2016/0078336 A1* | 3/2016 | Ari | G06K 19/06103 235/494 |

FOREIGN PATENT DOCUMENTS

| | | |
|---|---|---|
| CN | 102802049 A | 11/2012 |
| CN | 102982473 A | 3/2013 |
| CN | 103235965 A | 8/2013 |
| CN | 103426083 A | 12/2013 |
| CN | 103763178 A | 4/2014 |

OTHER PUBLICATIONS

International Search Report in international application No. PCT/CN2014/095777, dated Apr. 8, 2015.
English Translation of the Written Opinion of the International Search Authority in international application No. PCT/CN2014/095777, dated Apr. 8, 2015.
Notification of the First Office Action of Chinese application No. 201410003494.9, dated Sep. 14, 2015.
Notification of the Second Office Action of Chinese application No. 201410003494.9, dated Dec. 8, 2015.

* cited by examiner

INFORMATION PUSH METHOD, SERVER, USER TERMINAL AND SYSTEM

CROSS-REFERENCE TO RELATED APPLICATIONS

This is a continuation application of International Patent Application No. PCT/CN2014/095777, filed on Dec. 31, 2014, entitled "Information Push Method, Server, User Terminal and System", which claims the priority benefit of Chinese Patent Application No. 201410003494.9, filed Jan. 3, 2014, the contents of which are incorporated by reference herein in their entirety for all purposes.

FIELD OF THE DISCLOSURE

The present disclosure relates to the field of Internet technologies, and in particular, to an information push method, server, user terminal and system.

BACKGROUND OF THE DISCLOSURE

With the rapid development of Internet technologies, an Internet company needs to use various information push manners for pushing different kinds of information to a target user, and a two-dimensional code manner is an information push manner that develops rapidly in recent years. Two-dimensional code, also referred to as two-dimensional bar code, is a two-dimensional image in which specific geometric patterns are distributed on a plane (in two-dimensional directions) according to certain rules. The two-dimensional code is a key to disseminating information and data on the Internet. A user can locate Internet resources and perform activities such as Internet transaction by using a two-dimensional code. However, images of the two-dimensional code in the prior art are all of a same pattern for the user, which cannot attract more attention from the user, resulting in a relatively low click-through rate and use conversion rate of the two-dimensional code that is pushed on the Internet to the user.

SUMMARY

A first aspect of the embodiments of the present disclosure provides an information push method, and the method includes:

an information push server determining recommendation information that currently needs to be pushed to a target user;

the information push server obtaining setup information of the target user, where the setup information includes personalized graphic information preset by the target user;

the information push server generating, according to the setup information of the target user, a personalized two-dimensional code that bears the recommendation information, where an image of the personalized two-dimensional code carries the personalized graphic information preset by the target user; and the information push server pushing the personalized two-dimensional code to the target user.

Correspondingly, a second aspect of the embodiments of the present disclosure further provides an information push server, and the information push server includes:

a recommendation information determining module, configured to determine recommendation information that currently needs to be pushed to a target user;

a setup information obtaining module, configured to obtain setup information of the target user, where the setup information includes personalized graphic information preset by the target user;

a two-dimensional code generating module, configured to generate, according to the setup information of the target user, a personalized two-dimensional code that bears the recommendation information, where an image of the personalized two-dimensional code carries the personalized graphic information preset by the target user; and a sending module, configured to push the personalized two-dimensional code to the target user.

Correspondingly, a third aspect of the embodiments of the present disclosure further provides a user terminal, and the user terminal includes:

a two-dimensional code scanning module, configured to scan and parse a personalized two-dimensional code, to obtain recommendation information borne in the personalized two-dimensional code, where an image of the personalized two-dimensional code carries personalized graphic information preset by a user corresponding to the user terminal.

Correspondingly, a fourth aspect of the embodiments of the present disclosure further provides an information push system, and the system includes the information push server according to the second aspect of the embodiments of the present disclosure and the user terminal according the third aspect of the embodiments of the present disclosure, where:

the information push server determines recommendation information that currently needs to be pushed to a target user; obtains setup information of the target user, where the setup information includes personalized graphic information preset by the target user; generates, according to the setup information of the target user, a personalized two-dimensional code that bears the recommendation information, where an image of the personalized two-dimensional code carries the personalized graphic information preset by the target user; and pushes the personalized two-dimensional code to the target user; and the user terminal is configured to scan and parse the personalized two-dimensional code, to obtain the recommendation information borne in the personalized two-dimensional code.

In the embodiments of the present disclosure, an information push server can generate, according to setup information preset by a target user and recommendation information that needs to be pushed to the target user, a personalized two-dimensional code, so as to push the two-dimensional code carrying UGC to the target user, which can enrich presenting content of the two-dimensional code and make the pushed information attract more attention, thereby improving a click-through rate and conversion rate that the two-dimensional code pushed by the Internet has from a user.

BRIEF DESCRIPTION OF THE DRAWINGS

To describe the technical solutions of the embodiments of the present disclosure or the prior art more clearly, the accompanying drawings for illustrating the embodiments or the prior art will be introduced briefly in the following. Apparently, the drawings in the following description are only some embodiments of the present disclosure, and a person of ordinary skill in the art may obtain other drawings based on these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
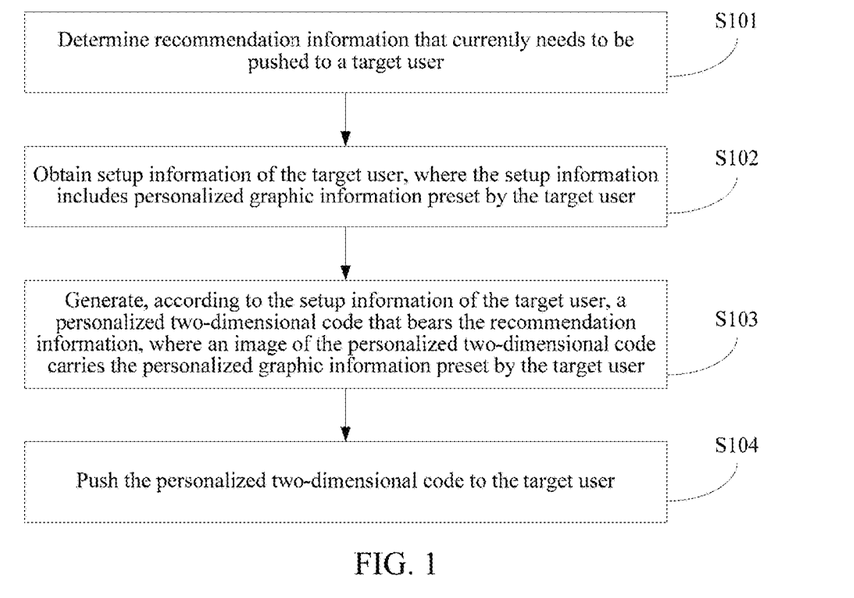
FIG. 1 is a schematic flowchart of an information push method according to an embodiment of the present disclosure.

FIG. 1 is a schematic flowchart of an information push method according to an embodiment of the present disclosure. The information push method of this embodiment is mainly described from an information push server side. As shown in the figure, the information push method of this embodiment may include:

S101: An information push server determines recommendation information that currently needs to be pushed to a target user.

The information push server in this embodiment of the present disclosure may be an Internet background server, may obtain an Internet behavior of a target user by using a related web server, SNS server or instant messaging server, and pushes, according to the Internet behavior of the target user, preset recommendation information to a webpage, an SNS client, or an instant messaging client corresponding to the target user by using the related web server, SNS server or instant messaging server. The recommendation information may include direction information such as a uniform resource locator (URL) and a network link address, and may also include recommendation content information such as commodity recommendation information, friend recommendation information, and network resource recommendation information. The commodity recommendation information may be information of physical commodities, may also be information of virtual commodities, such as information of various virtual cards and information of various applications, and may further be digital media information, such as digital music information.

In an implementation manner, the information push server pushes, to a user according to browse information that the user has on an e-commerce website by using a user terminal, information of a commodity that is of a same kind as a commodity viewed by the user, or a link of a comment article of the browsed commodity, or pushes to a user, according to conversation information that the user has with another user or in a group by using a user terminal, related friend recommendation information or commodity information related to a conversation. Further, when the recommendation information includes commodity recommendation information, the recommendation information may further include transaction information of a corresponding commodity, so that the user can initiate a transaction request for the commodity to a transaction processing server. The transaction information may include, for example, a transaction order and an amount of payment of a commodity transaction. S102: The information push server obtains setup information of the target user, where the setup information includes personalized graphic information preset by the target user.

Specifically, the setup information may be stored in relation to a user account of the target user, that is, for each user account, exclusive setup information of the account may be set, which includes the personalized graphic information preset by the target user, and may also include other personalized information of the user, such as interests and hobbies, common transaction payment methods, common transaction delivery addresses, and common contact information. The information push server may obtain the setup information of the target user according to the user account of the target user. For example, the target user may preset the setup information, and the information push server stores the setup information and the account of the target user in relation. In an optional embodiment, the setup information of the target user may also be stored in a client corresponding to the user, and obtained by the information push server from the client corresponding to the user when needed, so that the information push server can obtain the setup information of the user when needing; and the target user may also preset the setup information on an instant messaging server or an SNS server connected to the information push server, and the information push server obtains, according to a preset communication protocol and the user account of the target user, the setup information of the target user from the instant messaging server or the SNS server. In another embodiment, a user information management server that is set individually may be specifically used to manage the setup information of the user according to the user account, so that another server such as an information push server, an instant messaging server or an SNS server can obtain, by using the user information management server, the setup information preset by the user.

The personalized graphic information preset by the user may be a photograph, a virtual image or a user-defined picture preset by the user, for example, the personalized graphic information is set in advance by using a photograph or a local picture submitted through an upload interface, or by using resource location information of a target picture.

S103: The information push server generates, according to the setup information of the target user, a personalized two-dimensional code that bears the recommendation information, where an image of the personalized two-dimensional code carries the personalized graphic information preset by the target user.

Figure 4:
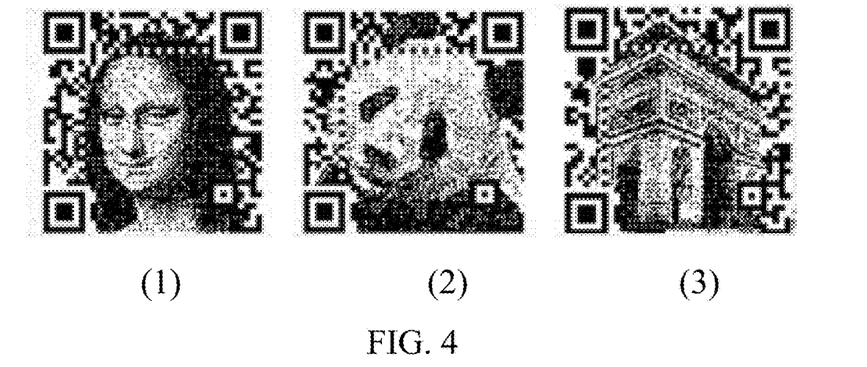
FIG. 4 is a schematic diagram of a graphic effect of a personalized two-dimensional code according to an embodiment of the present disclosure.

Specifically, the personalized two-dimensional code generated and obtained by the information push server according to the setup information of the target user and the recommendation information may be, for example, as shown in FIG. 4. Images of the two-dimensional code are no longer of a same pattern for the user, but personalized graphic information of the user is added to the images. For example, an image of the personalized two-dimensional code shown in FIG. 4(1) carries a human picture preset by the user, an image of the personalized two-dimensional code shown in FIG. 4(2) carries an animal picture preset by the user, an image of the personalized two-dimensional code shown in FIG. 4(3) carries an architectural picture preset by the user, and so on.

A specific process of generating the personalized two-dimensional code may include:

1) The information push server generates an initial two-dimensional code that bears the recommendation information. Two-dimensional code encoding is performed, according to a preset two-dimensional code encoding rule, on the recommendation information that needs to be pushed to the user, to obtain the initial two-dimensional code as shown at a right part of FIG. 11.

Figure 11:
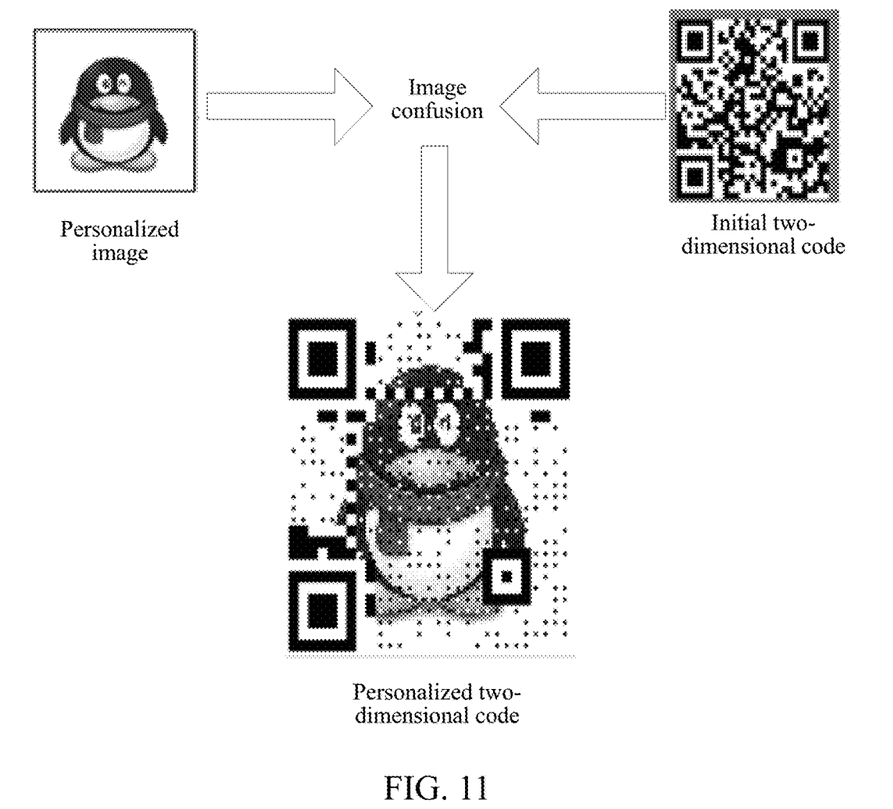
FIG. 11 is an example diagram of a method for generating a personalized two-dimensional code according to an embodiment of the present disclosure.

2) The information push server performs image fusion on the generated initial two-dimensional code and the personalized graphic information, so as to obtain the personalized two-dimensional code.

Figure 12:
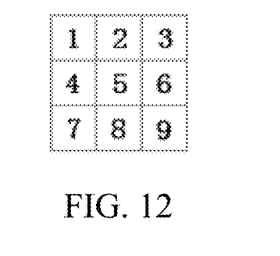
FIG. 12 is a schematic diagram of preset areas in an encoding unit obtained after an information push server divides an initial two-dimensional code according to an embodiment of the present disclosure.

Exemplarily, a specific process of image fusion may be as follows:

The initial two-dimensional code includes a parameter encoding area and a content encoding area. As "hollow-shape" graphic areas at lower left, upper left, and upper right of the initial two-dimensional code shown at a right part of FIG. 11, the parameter encoding area bears parameter information of a two-dimensional code, such as location, format and version of the two-dimensional code. A remaining area of the initial two-dimensional code is the content encoding area, which bears content of the two-dimensional code, that is, the recommendation information. The information push server divides the content encoding area of the initial two-dimensional code into multiple identical encoding units, fills a preset encoding area in each encoding unit with encoding information, and fills a remaining area in the encoding unit with corresponding personalized graphic information. Further, each encoding unit may be divided into multiple sub encoding areas. For example, as shown in FIG. 12, each encoding unit is divided into 3×3 identical sub encoding areas, then one of the sub encoding areas may be selected to be filled with the encoding information (that is, to be filled with black or white, so as to identify encoding of the two-dimensional code), and remaining sub encoding areas may be filled with the corresponding personalized graphic information. For example, in FIG. 12, a sub encoding area 5 is selected to be filled with the encoding information, remaining sub encoding areas 1 to 4 and 6 to 9 are used to be filled with the corresponding personalized graphic information, and the personalized two-dimensional code obtained through fusion in this way, as shown at a lower part of FIG. 11, can display a personalized graphic preset by the user in fusion on the basis that identification of the encoding of the two-dimensional code is not affected. In another optional embodiment, any one or more sub encoding area in the sub encoding areas 1 to 9 in FIG. 12 may be selected to be filled with the encoding information; and a dividing manner of 2×2 or 4×4 may also be used for dividing each encoding unit, at least one sub encoding area is selected from the encoding unit to be filled with the encoding information, and remaining sub encoding areas are used to be filled with the corresponding personalized graphic information.

S104: The information push server pushes the personalized two-dimensional code to the target user.

Figure 5:
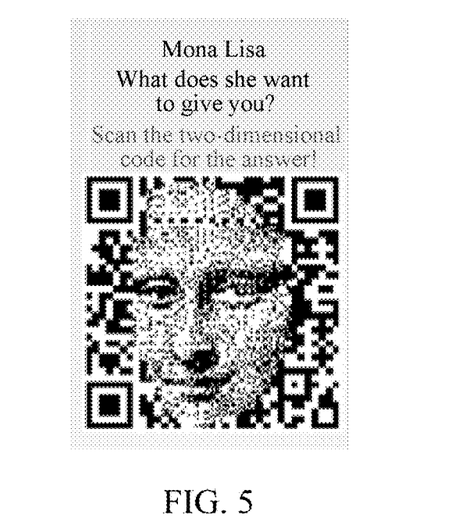
FIG. 5 is a schematic diagram of a display effect of recommendation information pushed to a target user according to an embodiment of the present disclosure.

Specifically, the information push server may push the personalized two-dimensional code generated and obtained in S103 to a user terminal of the target user, and may also push related information of the recommendation information to the user. FIG. 5 shows an example of push information that carries the personalized two-dimensional code and is pushed to the target user by the information push server.

The information push server may push the personalized two-dimensional code to be displayed on a webpage that is currently browsed by the user, or to be displayed by a browser popup window, and may also push the personalized two-dimensional code to an instant messaging client or an SNS webpage or an SNS client that is used by the user, and the instant messaging client or SNS webpage or SNS client displays the push information that carries the personalized two-dimensional code on a preset area.

Further, after the user uses the same user terminal or another user terminal to scan the personalized two-dimensional code, content of the personalized two-dimensional code carried in the personalized two-dimensional code may be obtained through parsing. For example, if the personalized two-dimensional code carries transaction information of a corresponding commodity in the recommendation information, the user may initiate, according to the transaction information of the commodity obtained through scanning and parsing, a transaction request of the commodity to a transaction processing server. For another example, if the personalized two-dimensional code carries user information of a social user or application information recommended by the information push server to the user, the user may initiate, according to the user information obtained through scanning and parsing, a social behavior of a corresponding user to the instant messaging server or the SNS server, or initiate, according to the application information obtained through scanning and parsing, an application installation request of a corresponding application to an application management server.

Further, the personalized two-dimensional code may be received by the user on a first user terminal (such as a personal computer), and then a second user terminal (such as a mobile terminal) is used to scan and parse the personalized two-dimensional code received by the first user terminal, to obtain content information included in the personalized two-dimensional code. In an optional embodiment, after receiving the personalized two-dimensional code, the first user terminal may scan and parse the received personalized two-dimensional code by using its own camera or two-dimensional code scanning software, to obtain the content information included in the personalized two-dimensional code.

It can be seen that, in the information push method described in FIG. 1, a personalized two-dimensional code can be generated according to personalized graphic information preset by a user and pushed to the user, so that a two-dimensional coded graphic is generated according to UGC, which enriches presenting content of the two-dimensional code and improves an attention rate of pushed information, thereby improving a click-through rate and conversion rate that the two-dimensional code pushed by the Internet has from a user.

Figure 2:
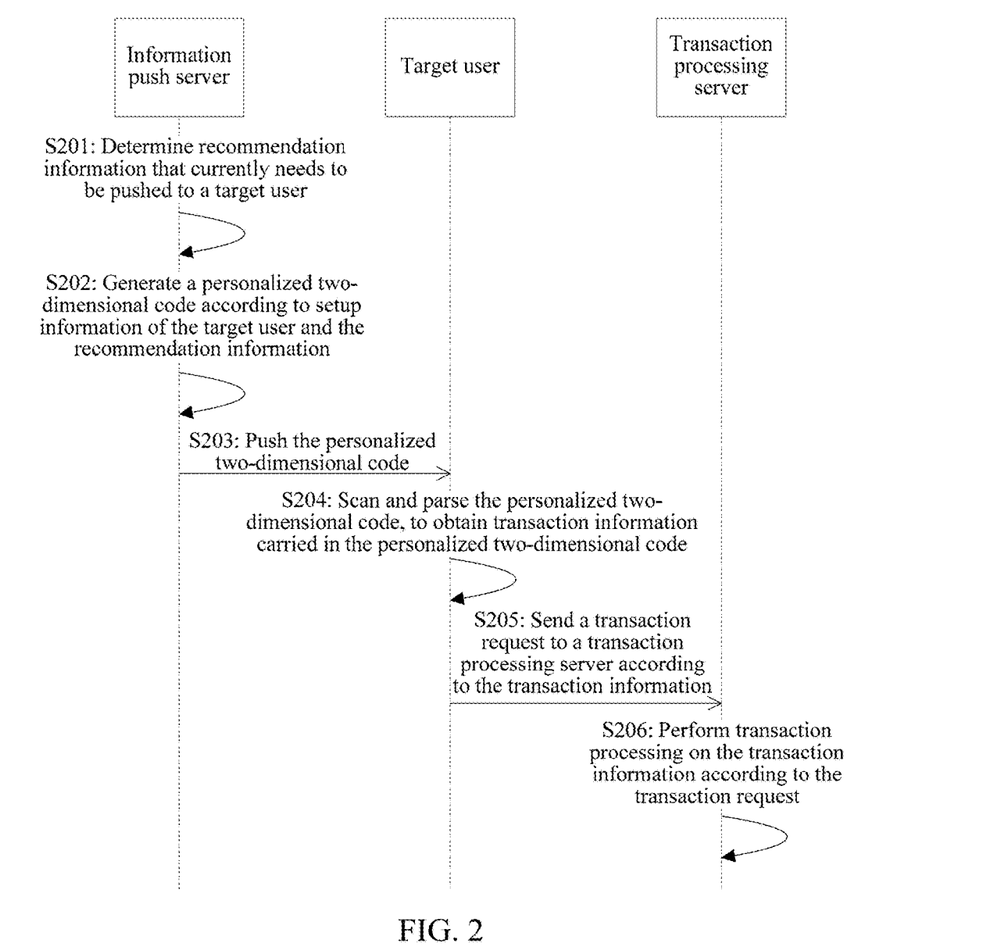
FIG. 2 is a schematic flowchart of an information push method according to another embodiment of the present disclosure.

FIG. 2 is a schematic flowchart of an information push method according to another embodiment of the present disclosure. The information push method described in FIG. 2 is mainly described from a user terminal side and an information push server side. In this implementation manner, commodity information is recommended as an example, which may certainly also be applied to a scenario. As shown in the figure, the information push method in this embodiment may include:

S201: An information push server determines recommendation information that currently needs to be pushed to a target user. The recommendation information in this embodiment may include transaction information. The transaction information includes a transaction order and an amount of payment, and may also include a commodity or service introduction related to the transaction.

S202: The information push server generates, according to setup information of the target user, a personalized two-dimensional code that bears the recommendation information, where an image of the personalized two-dimensional code carries personalized graphic information preset by the target user.

Specifically, manners in which the information push server obtains the setup information of the target user and generates the personalized two-dimensional code according to the setup information may be as described in detail in step S102 in the above embodiment, which are not described in this embodiment again. The setup information of the target user in this embodiment may further include transaction setup information of the target user, such as a transaction delivery address and/or transaction payment information, so that the user can directly use the preset transaction setup information to request a transaction processing server to perform transaction processing, which saves a process in which the user needs to input corresponding transaction information each time.

S203: The information push server pushes the personalized two-dimensional code to a user terminal of the target user.

Specifically, the information push server may push the personalized two-dimensional code generated and obtained in S202 to the user terminal of the target user, and may also push related information of the recommendation information to the user. FIG. 5 shows an example of push information that carries the personalized two-dimensional code and is pushed to the target user by the information push server. The information push server may push the personalized two-dimensional code to be displayed on a webpage that is currently browsed by the user, or to be displayed by a browser popup window, and may also push the personalized two-dimensional code to an instant messaging client or an SNS webpage or an SNS client that is used by the user, and the instant messaging client or SNS webpage or SNS client displays the push information that carries the personalized two-dimensional code on a preset area.

S204: The user terminal that is corresponding to the target user scans and parses the personalized two-dimensional code, to obtain transaction information carried in the personalized two-dimensional code.

In a specific implementation, the user terminal that is currently used by the target user may scan and parse, by using its own camera or two-dimensional code scanning software, the personalized two-dimensional code received by the user terminal self, to obtain the transaction information carried in the personalized two-dimensional code.

S205: The user terminal sends a transaction request to a transaction processing server according to the transaction information.

Figure 10:
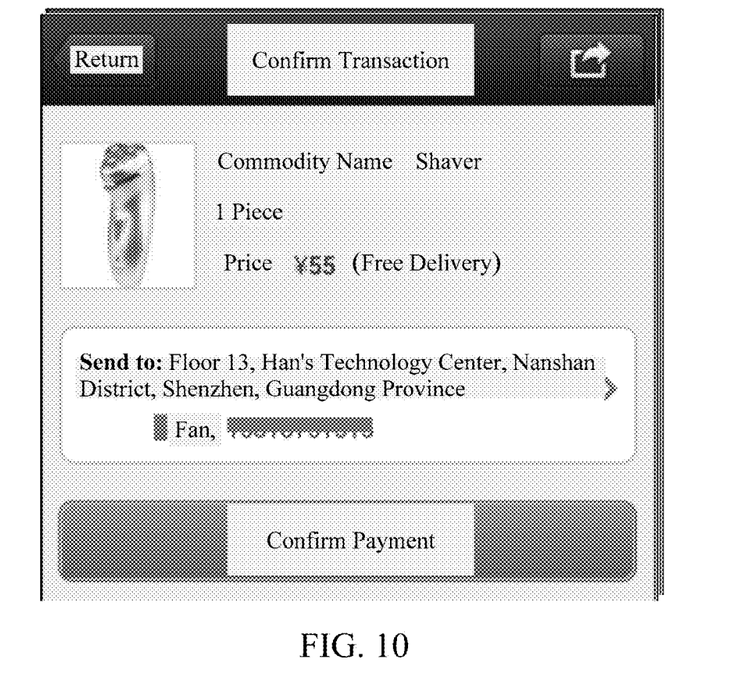
FIG. 10 is a schematic diagram of a transaction submission interface that is displayed according to transaction information obtained after a user terminal scans a personalized two-dimensional code according to an embodiment of the present disclosure.

Specifically, the user terminal may switch automatically to a transaction submission webpage according to the transaction information obtained through parsing, or switch automatically to a corresponding transaction submission interface in an instant messaging client or an SNS client, for example, as a client transaction submission interface shown in FIG. 10, so that the transaction request can be sent to a corresponding transaction processing server, and the transaction request carries the transaction information.

S206: The transaction processing server performs transaction processing on the transaction information according to the transaction request.

Specifically, the transaction processing server may perform subsequent transaction processing process on the transaction information according to the transaction request, for example, prompt the user to choose a payment method and set a delivery address, contact information, and the like, which may also include obtaining payment authentication information of the user according to a chosen payment method, and so on. Therefore, when completing the transaction processing of the transaction information, the transaction processing server may return a transaction processing result to the user terminal.

It can be seen that, in the information push method described in FIG. 2, a personalized two-dimensional code can be generated according to personalized graphic information preset by a user and pushed to the user, so that the user may initiate an on-line transaction process according to the personalized two-dimensional code.

Figure 3:
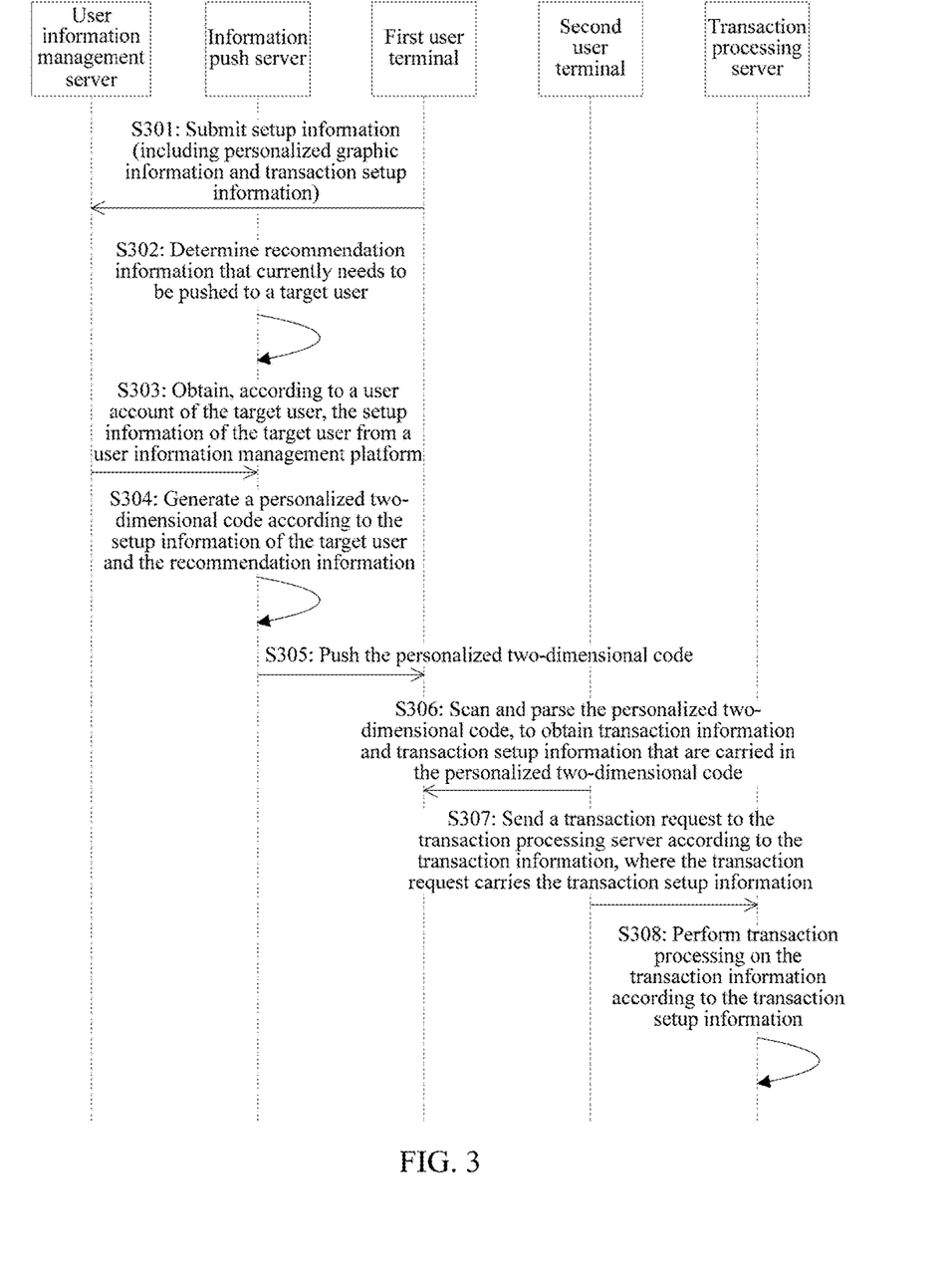
FIG. 3 is a schematic flowchart of an information push method according to another embodiment of the present disclosure.

FIG. 3 is a schematic flowchart of an information push method according to another embodiment of the present disclosure. As shown in the figure, the information push method in this embodiment may include:

S301: A first user terminal submits setup information to a user information management server, where the setup information in this embodiment includes personalized graphic information and transaction setup information that are preset by a target user, and may also include other personalized information of the user, such as interests and hobbies, an individual signature, and a self-introduction. In an optional embodiment, the user may submit the setup information to a corresponding server by using an instant messaging client or an SNS webpage or an SNS client, the user information management server may obtain the setup information of the user from the corresponding server, and the setup information may be stored in relation to a user account of the corresponding user, so that a subsequent information push server or transaction processing server can obtain the setup information of the user from the user information management server when needing. The transaction setup information may be, for example, a transaction delivery address and/or transaction payment information.

S302: An information push server determines recommendation information that currently needs to be pushed to the target user.

In a specific implementation, the information push server may determine, according to an Internet behavior of the first user terminal that is used by the target user, the recommendation information that needs to be pushed to the target user. The recommendation information may include commodity recommendation information, friend recommendation information, network resource recommendation information, and so on. For example, information of a commodity that is of a same kind as a commodity viewed by the user may be determined, according to browse information that the user has on an e-commerce website by using the first user terminal, to be pushed to the user; or, commodity information related to a conversation may be pushed, according to conversation information that the user has with another user or in a group by using the first user terminal, to the user. Further, the recommendation information may further include transaction information of a corresponding commodity, so that the user can initiate a transaction request for the commodity to a transaction processing server. The transaction information may include, for example, a transaction order and an amount of payment of a commodity transaction.

S303: The information push server obtains, according to a user account of the target user, the setup information of the target user from the user information management server.

Specifically, the user account of the target user may be a website login account, an access account of an instant messaging client, or an access account of an SNS client that is used by the target user on the first user terminal, and the user information management server may set an association relationship between the foregoing multiple accounts of a same user, so that even if the target user uses different kinds of accounts on the first user terminal, the information push server or the user information management server can correspondingly obtain the setup information of the target user.

S304: The information push server generates, according to the setup information of the target user, a personalized two-dimensional code that bears the recommendation information, where an image of the personalized two-dimensional code carries the personalized graphic information preset by the target user. A manner in which the information push server generates the personalized two-dimensional code according to the setup information may be as described in detail in step S102 in the above embodiment, which is not described in this embodiment again.

S305: The information push server pushes the personalized two-dimensional code to the first user terminal currently used by the target user.

Specifically, the information push server may push the personalized two-dimensional code generated and obtained in S304 to the user terminal of the target user, and may also push related information of the recommendation information to the user. FIG. 5 shows an example of push information that carries the personalized two-dimensional code and is pushed to the target user by the information push server. The information push server may push the personalized two-dimensional code to be displayed on a webpage that is currently browsed on the first user terminal, or to be displayed by a browser popup window, and may also push the personalized two-dimensional code to an instant messaging client or an SNS webpage or an SNS client in the first user terminal, and the instant messaging client or SNS webpage or SNS client in the first user terminal displays the push information that carries the personalized two-dimensional code on a preset area.

S306: The target user scans the personalized two-dimensional code displayed on the first user terminal by using a second user terminal, to obtain transaction information and transaction setup information that are carried in the personalized two-dimensional code.

S307: The second user terminal sends a transaction request to a transaction processing server according to the transaction information and the transaction setup information, that is, the transaction request submitted to the transaction processing server carries the transaction information and the transaction setup information.

S308: The transaction processing server performs transaction processing on the transaction information according to the transaction request.

Specifically, the transaction processing server in this embodiment may use the transaction setup information to perform processing on the transaction information. For example, a common delivery address preset by the user in the transaction setup information is set as a delivery address of this transaction, and a payment method (a payment account) preset by the user in the transaction setup information is set as a payment method of this transaction, thereby saving a large amount of user-defined transaction information needed to be filled in by hand each time the user submits a transaction request.

Figure 6:
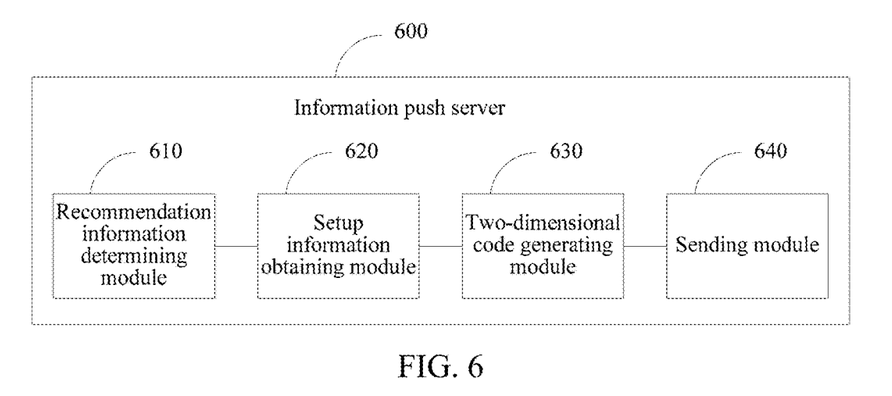
FIG. 6 is a schematic structural diagram of an information push server according to an embodiment of the present disclosure.

FIG. 6 is a schematic structural diagram of an information push server according to an embodiment of the present disclosure. As shown in the figure, an information push server 600 in this embodiment may include:

A recommendation information determining module 610 is configured to determine recommendation information that currently needs to be pushed to a target user.

In a specific implementation, the recommendation information determining module 610 may determine, according to a current Internet behavior of the target user, the recommendation information that needs to be pushed to the target user. The recommendation information may include commodity recommendation information, friend recommendation information, network resource recommendation information, and so on. For example, information of a commodity that is of a same kind as a commodity viewed by the user or a link of a comment article of the browsed commodity may be determined, according to browse information that the user has on an e-commerce website by using a user terminal, to be pushed to the user; or, related friend recommendation information or commodity information related to a conversation may be pushed, according to conversation information that the user has with another user or in a group by using a user terminal, to the user. Further, when the recommendation information includes commodity recommendation information, the recommendation information may further include transaction information of a corresponding commodity, so that the user can initiate a transaction request for the commodity to a transaction processing server. The transaction information may include, for example, a transaction order and an amount of payment of a commodity transaction.

A setup information obtaining module 620 is configured to obtain setup information of the target user, where the setup information includes personalized graphic information preset by the target user.

Specifically, the setup information may be stored in relation to a user account of the target user, includes the personalized graphic information preset by the target user, and may also include other personalized information of the user, such as interests and hobbies, common transaction payment methods, common transaction delivery addresses, and common contact information. The setup information obtaining module 620 may obtain the setup information of the target user according to the user account of the target user. For example, the target user may preset the setup information in the information push server, so that the setup information obtaining module 620 obtains the setup information of the user when needing; and the target user may also preset the setup information on an instant messaging server or an SNS server that cooperates with the information push server, so that the setup information obtaining module 620 can obtain, according to a preset cooperation protocol and the user account of the target user, the setup information of the target user from the instant messaging server or the SNS server. In another embodiment, a user information management server may be specifically used to manage the setup information of the user according to the user account, so that the setup information obtaining module 620 can obtain, according to the user account of the target user, the setup information preset by the user from the user information management server.

The personalized graphic information preset by the user may be a photograph or a user-defined picture preset by the user, for example, the personalized graphic information is set in advance by using a photograph or a local picture submitted through an upload interface, or by using resource location information of a target picture.

A two-dimensional code generating module 630 is configured to generate, according to the setup information of the target user, a personalized two-dimensional code that bears the recommendation information, where an image of the personalized two-dimensional code carries the personalized graphic information preset by the target user.

Specifically, the personalized two-dimensional code generated and obtained by the two-dimensional code generating module 630 according to the setup information of the target user and the recommendation information may be, for example, as shown in FIG. 4. Images of the two-dimensional code are no longer of a same pattern for the user, but personalized graphic information of the user is added to the images. For example, an image of the personalized two-dimensional code shown in FIG. 4(1) carries a human picture preset by the user, an image of the personalized two-dimensional code shown in FIG. 4(2) carries an animal picture preset by the user, an image of the personalized two-dimensional code shown in FIG. 4(3) carries an architectural picture preset by the user, and so on.

In an optional embodiment, the two-dimensional code generating module 630 may further include:

An initial two-dimensional code generating unit is configured to generate an initial two-dimensional code that bears the recommendation information. Two-dimensional code encoding is performed, according to a preset two-dimensional code encoding rule, on the recommendation information that needs to be pushed to the user, to obtain the initial two-dimensional code as shown at a right part of FIG. 11.

An image fusion unit is configured to perform image fusion on the generated initial two-dimensional code and the personalized graphic information, so as to obtain the personalized two-dimensional code.

Exemplarily, a specific process of image fusion may be as follows:

The initial two-dimensional code includes a parameter encoding area and a content encoding area. As "hollow-shape" graphic areas at lower left, upper left, and upper right of the initial two-dimensional code shown at a right part of FIG. 11, the parameter encoding area bears parameter information of a two-dimensional code, such as location, format and version of the two-dimensional code. A remaining area of the initial two-dimensional code is the content encoding area, which bears content of the two-dimensional code, that is, the recommendation information. The information push server divides the content encoding area of the initial two-dimensional code into multiple identical encoding units, fills a preset encoding area in each encoding unit with encoding information, and fills a remaining area in the encoding unit with corresponding personalized graphic information. Further, each encoding unit may be divided into multiple sub encoding areas. For example, as shown in FIG. 12, each encoding unit is divided into 3×3 identical sub encoding areas, then one of the sub encoding areas may be selected to be filled with the encoding information (that is, to be filled with black or white, so as to identify encoding of the two-dimensional code), and remaining sub encoding areas may be filled with the corresponding personalized graphic information. For example, in FIG. 12, a sub encoding area 5 is selected to be filled with the encoding information, remaining sub encoding areas 1 to 4 and 6 to 9 are used to be filled with the corresponding personalized graphic information, and the personalized two-dimensional code obtained through fusion in this way, as shown at a lower part of FIG. 11, can display a personalized graphic preset by the user in fusion on the basis that identification of the encoding of the two-dimensional code is not affected. In another optional embodiment, any one or more sub encoding area in the sub encoding areas 1 to 9 in FIG. 12 may be selected to be filled with the encoding information; and a dividing manner of 2×2 or 4×4 may also be used for dividing each encoding unit, at least one sub encoding area is selected from the encoding unit to be filled with the encoding information, and remaining sub encoding areas are used to be filled with the corresponding personalized graphic information.

Further, in an optional embodiment, content of the personalized two-dimensional code that is generated and obtained by the two-dimensional code generating module 630 may include the recommendation information. When the recommendation information includes commodity recommendation information, the recommendation information may further include transaction information of a corresponding commodity, and then may further include other setup information preset by the user and obtained by the setup information obtaining module 620, so that the user can initiate a transaction request for the commodity to a transaction processing server. such as a transaction delivery address and/or transaction payment information.

A sending module 640 is configured to push the personalized two-dimensional code to the target user.

Specifically, the sending module 640 may push the personalized two-dimensional code generated and obtained by the two-dimensional code generating module 630 to a user terminal of the target user, and may also push related information of the recommendation information to the user. FIG. 5 shows an example of push information that carries the personalized two-dimensional code and is pushed to the target user by the information push server. The sending module 640 may push the personalized two-dimensional code to be displayed on a webpage that is currently browsed by the user, or to be displayed by a browser popup window, and may also push the personalized two-dimensional code to an instant messaging client or an SNS webpage or an SNS client used by the user, and the instant messaging client or SNS webpage or SNS client displays the push information that carries the personalized two-dimensional code on a preset area. Further, after the user uses the same user terminal or another user terminal to scan the personalized two-dimensional code, content of the personalized two-dimensional code carried in the personalized two-dimensional code may be obtained through parsing. For example, if the personalized two-dimensional code carries transaction information of a corresponding commodity in the recommendation information, the user may initiate, according to the transaction information of the commodity obtained through scanning and parsing, a transaction request of the commodity to a transaction processing server. For another example, if the personalized two-dimensional code carries user information of a social user or application information recommended by the information push server to the user, the user may initiate, according to the user information obtained through scanning and parsing, a social behavior of a corresponding user to the instant messaging server or the SNS server, or initiate, according to the application information obtained through scanning and parsing, an application installation request of a corresponding application to an application management server.

Figure 7:
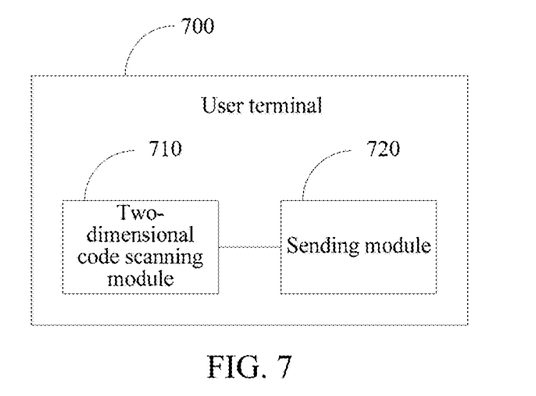
FIG. 7 is a schematic structural diagram of a user terminal according to an embodiment of the present disclosure.

FIG. 7 is a schematic structural diagram of a user terminal according to an embodiment of the present disclosure. The user terminal in the embodiments of the present disclosure may be a communication terminal, such as a personal computer (PC), a tablet computer, a mobile phone, a smart phone, a notebook computer, or a vehicle terminal. As shown in the figure, a user terminal 700 in this embodiment of the present disclosure at least may include:

A two-dimensional code scanning module 710 is configured to scan and parse a personalized two-dimensional code, to obtain recommendation information borne in the personalized two-dimensional code, where an image of the personalized two-dimensional code carries personalized graphic information preset by a user corresponding to the user terminal.

In a specific implementation, the information push server may determine, according to an Internet behavior of the target user, the recommendation information that needs to be pushed to the target user, then generate the personalized two-dimensional code according to the recommendation information and setup information of the target user, and push the personalized two-dimensional code to a user terminal used by the target user. Further, the personalized two-dimensional code is received on a first user terminal (such as a personal computer), and then a two-dimensional code scanning module 710 of a second user terminal (such as a mobile terminal) is used to scan and parse the personalized two-dimensional code received by the first user terminal, to obtain content information included in the personalized two-dimensional code. In an optional embodiment, after receiving the personalized two-dimensional code and by using its own two-dimensional code scanning module 710 (for example, including a camera or two-dimensional code scanning software), the first user terminal may scan and parse the personalized two-dimensional code received by the first user terminal, to obtain the content information included in the personalized two-dimensional code, which may include the recommendation information, and may also include the setup information of the target user.

The recommendation information obtained through parsing the personalized two-dimensional code may include commodity recommendation information, friend recommendation information, network resource recommendation information, and so on. When the recommendation information includes commodity recommendation information, the recommendation information may further include transaction information of a corresponding commodity, so that the user can initiate a transaction request for the commodity to a transaction processing server. The transaction information may include, for example, a transaction order and an amount of payment of a commodity transaction.

The setup information of the user obtained through parsing the personalized two-dimensional code may be stored in relation to a user account of the target user in the information push server or a user information management server, includes the personalized graphic information preset by the target user, and may also include other personalized information of the user, such as interests and hobbies, and transaction setup information, like common transaction payment methods, common transaction delivery addresses, and common contact information. The personalized graphic information preset by the user may be a photograph or a user-defined picture preset by the user, for example, the personalized graphic information is set in advance by using a photograph or a local picture submitted through an upload interface, or by using resource location information of a target picture. For example, the target user may preset the setup information in the information push server, so that the information push server obtains the setup information of the user when needing; and the target user may also preset, by using a user terminal, the setup information on an instant messaging server or an SNS server that cooperates with the information push server, so that the information push server can obtain, according to a preset cooperation protocol and the user account of the target user, the setup information of the target user from the instant messaging server or the SNS server. In another embodiment, a user information management server may be specifically used to manage the setup information of the user according to the user account, so that another server such as an information push server, an instant messaging server or an SNS server can obtain, by using the user information management server, the setup information preset by the user.

Optionally, the user terminal 700 in this embodiment of the present disclosure may further include:

A sending module 720 is configured to send a transaction request to a transaction processing server according to the transaction information, so that the transaction processing server performs transaction processing on the transaction information according to the transaction request.

Specifically, the sending module 720 may switch automatically to a transaction submission webpage according to the transaction information obtained by the two-dimensional code scanning module 710 through parsing, or switch automatically to a corresponding transaction submission interface in an instant messaging client or an SNS client, for example, as a client transaction submission interface shown in FIG. 10, and the sending module 720 sends the transaction request to a corresponding transaction processing server, and the transaction request carries the transaction information. Therefore, the transaction processing server may perform subsequent transaction processing process on the transaction information according to the transaction request, for example, prompt the user to choose a payment method and set a delivery address, contact information, and the like, which may also include obtaining payment authentication information of the user according to a chosen payment method, and so on. Furthermore, if the two-dimensional code scanning module 710 obtains transaction setup information preset by the target user through parsing the personalized two-dimensional code, the transaction request sent by the sending module 720 to the transaction processing server may further include the transaction setup information, so that the transaction processing server can use the transaction setup information to perform processing on the transaction information. For example, a common delivery address preset by the user in the transaction setup information is set as a delivery address of this transaction, and a payment method (a payment account) preset by the user in the transaction setup information is set as a payment method of this transaction, thereby saving a large amount of user-defined transaction information needed to be filled in by hand each time the user submits a transaction request.

Figure 8:
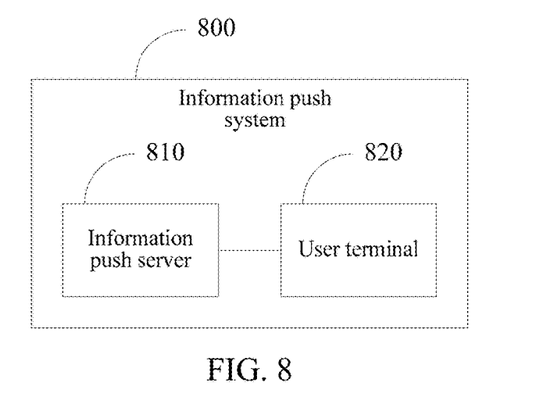
FIG. 8 is a schematic structural diagram of an information push system according to an embodiment of the present disclosure.

FIG. 8 is a schematic structural diagram of an information push system according to an embodiment of the present disclosure. As shown in the figure, the information push system in this embodiment may include an information push server 810 and a user terminal 820.

The information push server 810 may be the information push server described with reference to FIG. 6 in the above embodiments, and is configured to: determine recommendation information that currently needs to be pushed to a target user; obtain setup information of the target user, where the setup information includes personalized graphic information preset by the target user; generate, according to the setup information of the target user, a personalized two-dimensional code that bears the recommendation information, where an image of the personalized two-dimensional code carries the personalized graphic information preset by the target user; and push the personalized two-dimensional code to the target user.

Specifically, the setup information may be stored in relation to a user account of the target user, includes the personalized graphic information preset by the target user, and may also include other personalized information of the user, such as interests and hobbies, common transaction payment methods, common transaction delivery addresses, and common contact information. The information push server 810 may obtain the setup information of the target user according to the user account of the target user. For example, the target user may preset the setup information in the information push server 810, so that the information push server 810 obtains the setup information of the user when needing; and the target user may also preset the setup information on an instant messaging server or an SNS server that cooperates with the information push server 810, so that the information push server 810 can obtain, according to a preset cooperation protocol and the user account of the target user, the setup information of the target user from the instant messaging server or the SNS server. Optionally further, the recommendation information may include transaction information, and the transaction information includes a transaction order and an amount of payment.

The user terminal 820 is configured to scan and parse the personalized two-dimensional code, to obtain the recommendation information borne in the personalized two-dimensional code.

Specifically, the user terminal 820 may receive the personalized two-dimensional code pushed by the information push server 810, or another user terminal may receive the personalized two-dimensional code; and then the user terminal 820 scans and parses the personalized two-dimensional code received by the user terminal 820. For example, the personalized two-dimensional code may be received by the user on a first user terminal (such as a personal computer), and then a second user terminal (such as a mobile terminal) is used to scan and parse the personalized two-dimensional code received by the first user terminal, to obtain content information included in the personalized two-dimensional code. In an optional embodiment, after receiving the personalized two-dimensional code, the first user terminal may scan and parse the received personalized two-dimensional code by using its own camera or two-dimensional code scanning software, to obtain the content information included in the personalized two-dimensional code.

Optionally further, when the user terminal 820 obtains the transaction information through parsing the personalized two-dimensional code, the user terminal 820 is further configured to send a transaction request to a transaction processing server according to the transaction information, so that the transaction processing server performs transaction processing on the transaction information according to the transaction request. Further, if the user terminal 820 corresponding to the target user scans and parses the personalized two-dimensional code, and obtains transaction setup information preset by the target user, the transaction request sent by the user terminal 820 to the transaction processing server carries the transaction setup information, so that the transaction processing server processes the transaction information according to the transaction setup information.

Figure 9:
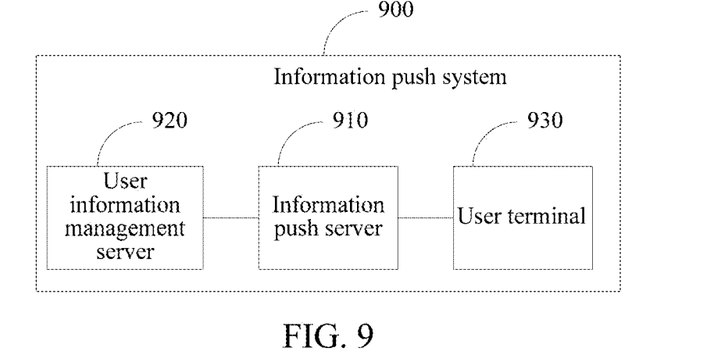
FIG. 9 is a schematic structural diagram of an information push system according to another embodiment of the present disclosure.

FIG. 9 is a schematic structural diagram of an information push system according to another embodiment of the present disclosure. As shown in the figure, the information push system in this embodiment may include: an information push server 910, a user information management server 920 and a user terminal 930.

The information push server 910 may be the information push server described with reference to FIG. 6 in the above embodiments, and is configured to: determine recommendation information that currently needs to be pushed to a target user; obtain, according to a user account of the target user, setup information of the target user from a user information management server, where the setup information includes personalized graphic information preset by the target user; generate, according to the setup information of the target user, a personalized two-dimensional code that bears the recommendation information, where an image of the personalized two-dimensional code carries the personalized graphic information preset by the target user; and push the personalized two-dimensional code to the target user.

Specifically, the setup information may be stored in relation to the user account of the target user, includes the personalized graphic information preset by the target user, and may also include other personalized information of the user, such as interests and hobbies, common transaction payment methods, common transaction delivery addresses, and common contact information. In this embodiment, the user information management server is specifically used to manage the setup information of the user according to the user account, and the information push server 910 may obtain, by using the user information management server, the setup information preset by the user.

The user information management server 920 is configured to manage the setup information preset by the user according to the user account.

In a specific implementation, the user may register his/her own setup information directly on the user information management server 920, and may also preset the setup information on an instant messaging server or an SNS server that cooperates with the user information management server 920, then the user information management server 920 manages, according to a preset cooperation protocol and the user account, the setup information preset by the user for the corresponding user. Therefore, when needed by the information push server 910, the setup information of the target user is returned to the information push server 910 according to the user account provide by the information push server 910.

The user terminal 930 is configured to scan and parse the personalized two-dimensional code, to obtain the recommendation information borne in the personalized two-dimensional code.

Specifically, the user terminal 930 may receive the personalized two-dimensional code pushed by the information push server 910, or another user terminal may receive the personalized two-dimensional code; and then the user terminal 930 scans and parses the personalized two-dimensional code received by the user terminal 930. For example, the personalized two-dimensional code may be received by the user on a first user terminal (such as a personal computer), and then a second user terminal (such as a mobile terminal) is used to scan and parse the personalized two-dimensional code received by the first user terminal, to obtain content information included in the personalized two-dimensional code. In an optional embodiment, after receiving the personalized two-dimensional code, the first user terminal may scan and parse the received personalized two-dimensional code by using its own camera or two-dimensional code scanning software, to obtain the content information included in the personalized two-dimensional code.

Optionally further, when the user terminal 930 obtains the transaction information through parsing the personalized two-dimensional code, the user terminal 930 is further configured to send a transaction request to a transaction processing server according to the transaction information, so that the transaction processing server performs transaction processing on the transaction information according to the transaction request. Further, if the user terminal 930 corresponding to the target user scans and parses the personalized two-dimensional code, and obtains transaction setup information preset by the target user, the transaction request sent by the user terminal 930 to the transaction processing server carries the transaction setup information, so that the transaction processing server processes the transaction information according to the transaction setup information.

In the embodiments of the present disclosure, an information push server can generate, according to setup information preset by a target user and determined recommendation information that needs to be pushed to the target user, a personalized two-dimensional code, so as to push the two-dimensional code carrying UGC to the target user, which can enrich presenting content of the two-dimensional code and improve an attention rate of the pushed information, thereby improving a click-through rate and conversion rate that the two-dimensional code pushed by the Internet has from a user.

A person of ordinary skill in the art may understand that all or some of the processes of the foregoing embodiments and methods may be implemented by a computer program instructing relevant hardware, the program may be stored in a computer readable storage medium, and when being executed, the program may include the processes of the foregoing embodiments of the methods. The storage medium may be a magnetic disk, an optical disc, a read-only memory (ROM), or a random access memory (RAM), or the like.

The foregoing descriptions are merely exemplary embodiments of the present disclosure, which certainly cannot be used to limit the scope of rights of present disclosure, and therefore any equivalent variation made according to the claims of the present disclosure still falls within the scope covered by the present disclosure.

What is claimed is:

1. An information push method, comprising:
   determining, by an information push server, recommendation information that is to be pushed to a target user;
   obtaining, by the information push server, setup information of the target user, wherein the setup information comprises personalized graphic information preset by the target user;
   generating, by the information push server, an initial two-dimensional code that bears the recommendation information, and dividing, by the information push server, a content encoding area of the initial two-dimensional code into multiple identical encoding units, dividing each encoding unit into multiple identical sub-encoding areas, for each encoding unit, filling one or more fixed sub-encoding areas with encoding information, and filling remaining sub-encoding areas with corresponding personalized graphic information, so as to obtain a personalized two dimensional code in which encoding information and the personalized graphic information are interlaced with each other, wherein an image of the personalized two-dimensional code carries the personalized graphic information preset by the target user; and
   pushing, by the information push server, the personalized two-dimensional code to the target user.

2. The information push method according to claim 1, wherein, the recommendation information comprises transaction information, and the transaction information comprises a transaction order and an amount of payment; and
   after pushing, by the information push server, the personalized two-dimensional code to the target user, the method further comprises:
   scanning and parsing, by a user terminal that is corresponding to the target user, the personalized two-dimensional code, to obtain the transaction information carried in the personalized two-dimensional code; and
   sending, by the user terminal, a transaction request to a transaction processing server according to the transaction information, so that the transaction processing server performs transaction processing on the transaction information according to the transaction request.

3. The information push method according to claim 2, wherein, the setup information further comprises transaction setup information preset by the target user;
   the user terminal that is corresponding to the target user scans and parses the personalized two-dimensional code to further obtain the transaction setup information preset by the target user; and
   the transaction request sent by the user terminal to the transaction processing server carries the transaction setup information, so that the transaction processing server processes the transaction information according to the transaction setup information.

4. The information push method according to claim 3, wherein, obtaining, by the information push server, setup information of the target user comprises:
   obtaining, by the information push server, according to a user account of the target user, the setup information of the target user from a user information management server.

5. The information push method according to claim 2, wherein, obtaining, by the information push server, setup information of the target user comprises:

obtaining, by the information push server, according to a user account of the target user, the setup information of the target user from a user information management server.

6. The information push method according to claim 1, wherein, obtaining, by the information push server, setup information of the target user comprises:

obtaining, by the information push server, according to a user account of the target user, the setup information of the target user from a user information management server.

7. An information push server, comprising:

one or more processors;

memory; and one or more modules stored in the memory and to be executed by the one or more processors, the one or more modules comprising:

a recommendation information determining module, configured to determine recommendation information that currently needs to be pushed to a target user;

a setup information obtaining module, configured to obtain setup information of the target user, wherein the setup information comprises personalized graphic information preset by the target user;

a two-dimensional code generating module, comprising an initial two-dimensional code generating unit and an image fusion unit, wherein the initial two-dimensional code generating unit is configured to generate an initial two-dimensional code that bears the recommendation information; and the image fusion unit is configured to divide a content encoding area of the initial two-dimensional code into multiple identical encoding units, divide each encoding unit into multiple identical sub-encoding areas, for each encoding unit, fill one or more fixed sub-encoding areas with encoding information, and fill remaining sub-encoding areas with corresponding personalized graphic information, so as to obtain a personalized two dimensional code in which encoding information and the personalized graphic information are interlaced with each other; and a sending module, configured to push the personalized two-dimensional code to the target user.

8. The information push server according to claim 7, wherein, the setup information obtaining module is configured to:

obtain, according to a user account of the target user, the setup information of the target user from a user information management server.

9. The information push server according to claim 7, wherein, the recommendation information comprises transaction information, and the transaction information comprises a transaction order and an amount of payment; and the setup information further comprises transaction setup information preset by the target user.

* * * * *